Jan. 3, 1967  R. H. BAUMAN  3,295,638
BRAKE SHOE CENTERING MECHANISM
Filed Oct. 7, 1964  2 Sheets-Sheet 1
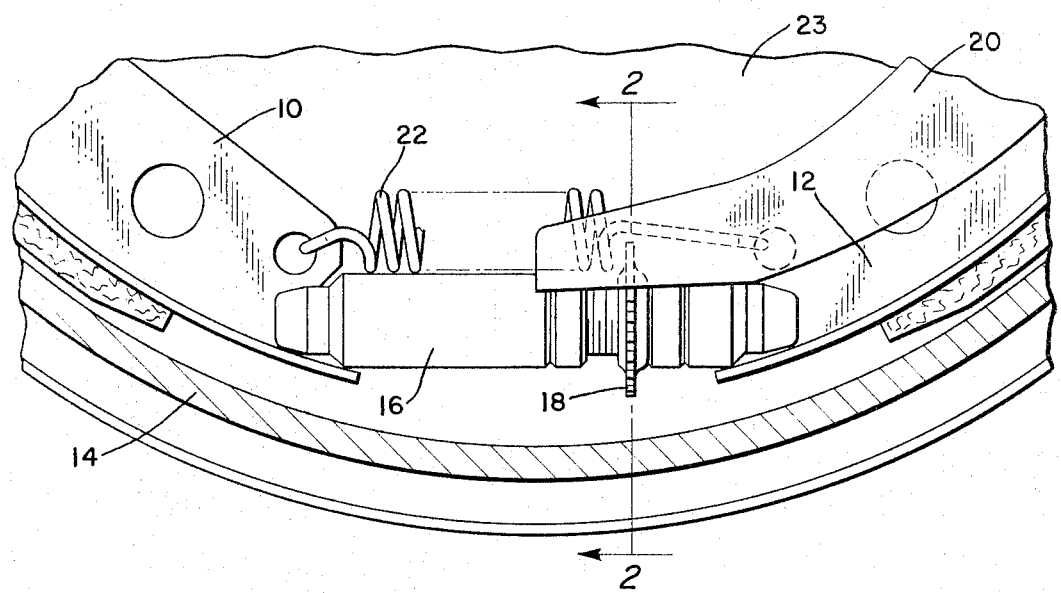
Fig. 1
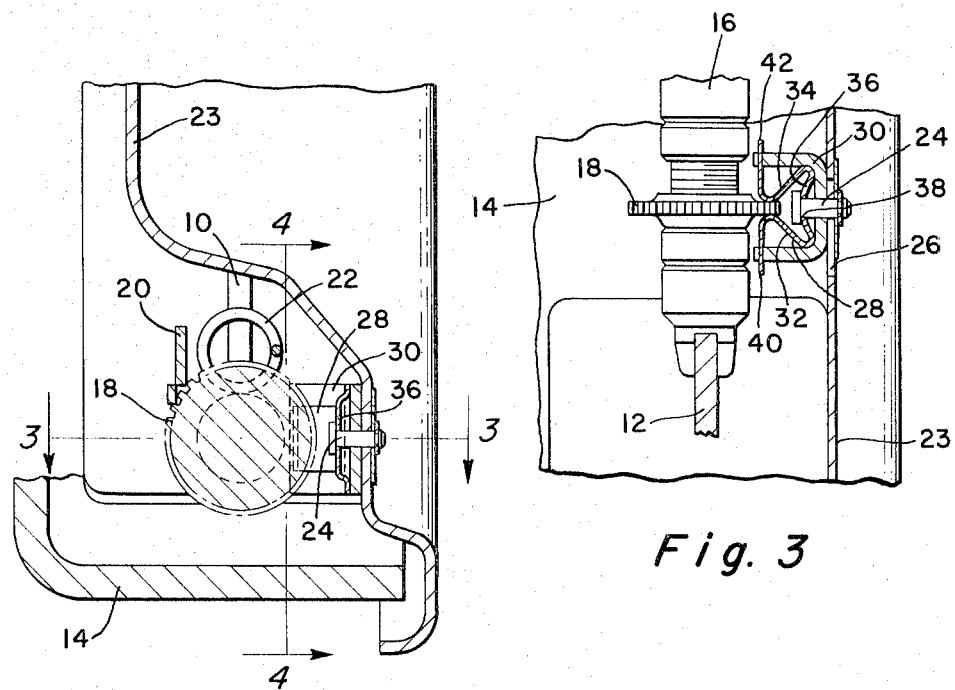
Fig. 2
Fig. 3
INVENTOR.
Robert H. Bauman
BY Donald P. Silverski
His Attorney Jan. 3, 1967    R. H. BAUMAN    3,295,638
BRAKE SHOE CENTERING MECHANISM
Filed Oct. 7, 1964    2 Sheets-Sheet 2

INVENTOR.
Robert H. Bauman
BY
His Attorney

United States Patent Office 3,295,638
Patented Jan. 3, 1967

3,295,638
BRAKE SHOE CENTERING MECHANISM
Robert H. Bauman, Dayton, Ohio, assignor to General Motors Corporation, Detroit, Mich., a corporation of Delaware
Filed Oct. 7, 1964, Ser. No. 402,088
5 Claims. (Cl. 188—79.5)

This invention relates to braking mechanism and more particularly to a mechanism adapted to center brake shoes relative to brake drums.

It is an object of the present invention to provide an improved brake shoe centering mechanism.

It is another object of the present invention to provide an improved brake shoe centering mechanism that is adaptable for use with an automatic brake adjuster.

It is still another object of the present invention to provide an improved brake centering mechanism that automatically compensates for movement in an automatic brake adjuster as the linings wear.

Further objects and advantages of the present invention will be apparent from the following description, reference being had to the accompanying drawings wherein a preferred embodiment of the present invention is clearly shown.

In the drawings:

FIGURE 1 is a fragmentary view of a typical brake shoe positioning device which incorporates the subject invention;

FIGURE 2 is a sectional view taken along line 2—2 of FIGURE 1;

FIGURE 3 is a sectional view taken along line 3—3 of FIGURE 2;

Figure 4:
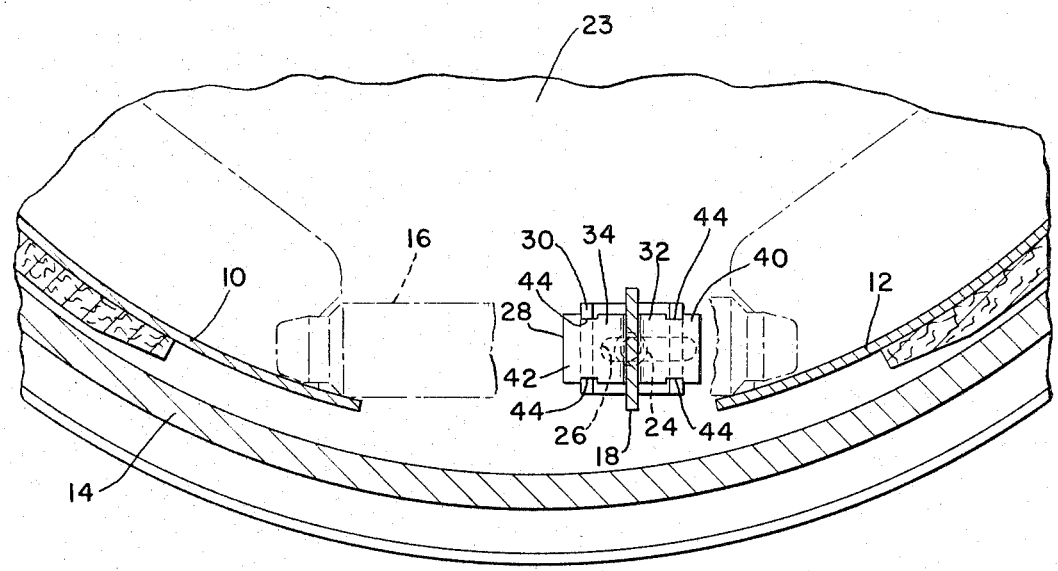
FIGURE 4 is a sectional view taken along line 4—4 of FIGURE 2.

Referring now to FIGURE 1, a brake shoe 10 and a brake shoe 12 are illustrated in a position of rest in juxtaposition to a rotatable drum 14. An expandable device 16 is actuated by a star wheel 18 to spread the brake shoes 10 and 12 further apart and, consequently, closer to the drum 14. An adjusting lever 20 is actuated in any well-known manner and peripherally engages the star wheel 18 during brake operation to rotate the star wheel and position the brake shoes 10 and 12 nearer the drum 14 as lining wear occus. A spring 22 maintains the brake shoes 10 and 12 in biased engagement with the expandable device 16.

Referring now to FIGURE 2, a backing plate 23 attached to a relatively fixed portion of the vehicle carries the subject invention. Referring now to FIGURE 3, a pin 24 is disposed in a slot 26 and serves to retain a resilient means 28 firmly against a U-shaped bracket 30 which in turn frictionally engages the backing plate 23.

The resilient means 28 is substantially omega shaped and has opposed resilient portions 32 and 34 bearing on opposite sides of the star wheel 18. The resilient means has a depressed head portion 36 including an aperture 38 therethrough adapted to receive the pin 24.

Figure 5:
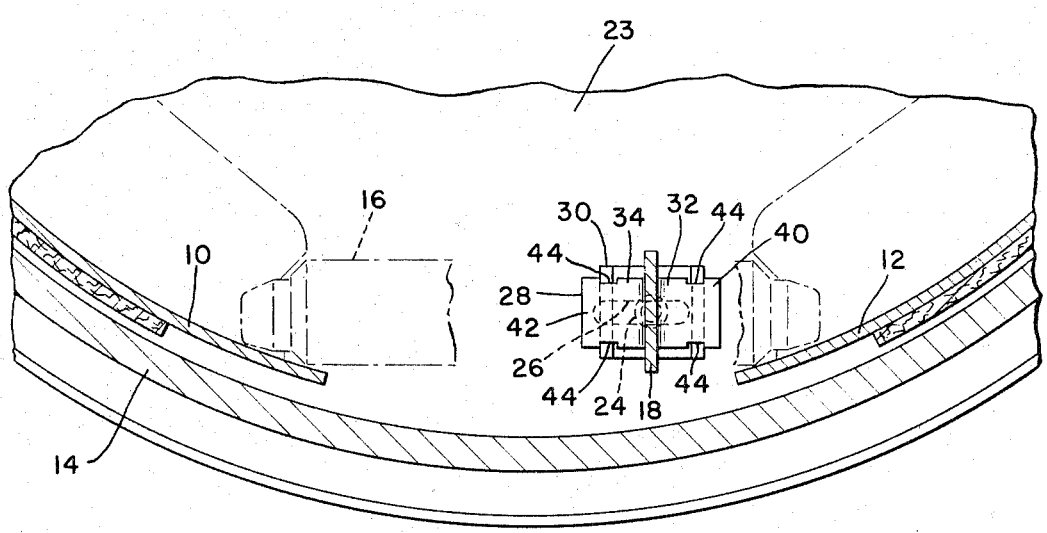
FIGURE 5 illustrates the mechanism of FIGURE 4 in an adjusted position.

Referring now to FIGURE 5, a resilient means 28 includes outwardly projecting legs 40 and 42 carried by the opposed portions 32 and 34, respectively, and includes laterally disposed slots 44. The slots 44 have greater base length than the width of the U-shaped bracket 30, thereby providing a lost motion connection therebetween. The design of the device is such that the amount of movement possible between the slot 44 and the upstanding portions of the U-shaped bracket 30 is proportional to the amount of clearance between the brake shoes 10 and 12 and the drum 14.

In operation and referring to FIGURE 1, when a brake is applied, the brake shoes 10 and 12 are driven into engagement with a rotating drum 14. As the brake action occurs and the linings carried by the brake shoes 10 and 12 contact the rotating drum 14, the brake shoes and the expandable means 16 are driven along the periphery of the drum 14 in the direction of rotation due to the normal brake servo action. It is seen in FIGURE 1 that this movement of the expandable device and the shoes 10 and 12 results in the star wheel 18 following in that movement. It is possible that the return springs, not shown, normally operative to center the brake shoes 10 and 12 are not effective to center the lower portions of the brake shoes.

Referring now to FIGURE 3, the resilient means 28 engages opposed sides of the star wheel 18 for centering the brake shoes relative to the rotating drum 14 after the braking pressure is relieved. It is understood that the resilient means 28 is effective only to center the free ends of the brake shoes illustrated in FIGURE 1 and the upper ends of the brake shoes, not shown, are centered in a conventional manner. The opposed portions 32 and 34 are resilient and allow a certain amount of movement of the star wheel 18 before the legs 40 and 42 contact the relatively fixed U-shaped bracket 30. This amount of movement is illustrated in FIGURE 5 and is represented by the lost motion connection between the bracket 30 and the slots 44 in the legs 40 and 42.

If the braking action drives the shoes a greater distance than represented by the lost motion connection previously described, the ends of the slots 44 will contact the upstanding portions of the U-shaped bracket 30 and the bracket 30 will be driven along the backing plate 23. It is clear then that the frictional engagement between the U-shaped bracket 30 and the backing plate 23 is overcome by the servo action of the brakes but cannot be overcome by the resiliency of the opposed portions 32 and 34. The slot 26 is provided in the backing plate 23 to allow the pin 24 to move a controlled distance. Normally, the slots 44 provide sufficient freedom for the star wheel 18 to be moved without a repositioning of the bracket 30. This amount of movement is substantially proportional to the normal predetermined clearance between the brake shoes 10 and 12 and the drum 14. However, as the brake linings wear, the expandable device 16 takes up this extra distance between the brake shoes and the drum.

Referring to FIGURE 1, it is clear that, as the star wheel 18 causes an expansion of the device 16, the star wheel 18 will be repositioned. The repositioning results from increasing wear in the brake shoes which brings the static position of the brake shoe 12 closer to the drum 14. The star wheel 18 typically moves with the brake shoe 12 as a lining associated therewith is worn. It is seen that a star wheel 18 will move to the right, as viewed in FIGURE 1, as the lining carried by the brake shoe 12 wears.

Referring now to FIGURE 5, the pin 24 is free to move in the slot 26 when the biasing force of the depressed head portion 36 is overcome by a braking action. Therefore, a new base point is established for the U-shaped bracket 30 and subsequent brake applications will cause a movement of the star wheel 18 of a magnitude proportional to the width of the slots 44. This is presuming that the drum 14 is traveling in the same direction relative to the shoes 10 and 12 with each subsequent application.

If the drum 14 is rotated in the opposite direction than originally described, the servo action of the brake shoes 10 and 12 against the drum 14 will be reversed and the slot 44 will allow a controlled amount of movement in that direction. However, it is possible that repeated brake applications during this opposite rotation of the drum 14 will result in brake lining wear of a magnitude sufficient to cause a shifting of the bracket 30 in the opposite direction. Therefore, it is obvious that the bracket 30 is essentially a floating base from which the brake shoes can be centered under any operating condition.

If the subject device is used on a brake system which is automatically adjustable, such as illustrated in FIGURE 1, the movement of the pin 24 in the slot 26 will be generally in the same direction in view of the maintained clearance between the shoes 10 and 12 and the drum 14. The likelihood of sufficient brake lining wear to cause a reshifting of the bracket 30 while the drum 14 is reversely rotating is very small. Normally, repeated brake applications sufficient to wear a brake lining occur only while a vehicle is moving in a forward direction and the drum 14 is rotating in the direction first described.

In a mounting of the subject device on the brake system on which an automatic adjuster is not employed, a greater interval is likely to exist between brake adjustments. Consequently, the predetermined clearance between the shoes 10 and 12 and the drum 14 will not be so closely maintained and it is likely that, very often, the slots 44 will not be large enough to accommodate the excessive actuating movement of the brake shoes 10 and 12. Under these conditions, the pin 24 may be repeatedly positioned in the slot 26 during applications of the brakes whether the vehicle is moving in a forward or reverse direction. The resilient mounting of the bracket 30 to the backing plate 23 will always be overcome during a brake actuation and this excessive movement of the shoes will be accommodated by the slot 26.

It is obvious that it would be possible to incorporate the feature of warning a vehicle operator of excessive lining wear by the incorporation of a warning device actuable by the moving pin 24. Brake adjusters of common design very often adjust vehicle brakes even when brake lining wear is dangerously low. Utilization of this pin movement to warn the driver of excessive brake lining wear would be within the spirit of this invention.

While the embodiment of the present invention, as herein disclosed, constitutes a preferred form, it is to be understood that other forms might be adopted.

What is claimed is as follows:

1. Brake centering mechanism comprising: a brake drum arranged to rotate with a vehicle wheel; a stationary member; brake shoes biasedly carried by said stationary member in juxtaposition to said brake drum; automatic adjusting means including a star wheel actuator disposed between said brake shoes and arranged to maintain a predetermined clearance between said brake drum and said brake shoes; and centering means for said brake shoes having portions disposed on either side of said adjusting means and including a bracket adjustably carried by said stationary member and resilient means carried by said bracket and engaging said adjusting means, said resilient means adapting said adjusting means to be yieldable relative to said stationary member during wheel rotation in either direction, said resilient means having portions spaced from said bracket a distance proportional to the predetermined clearance between said brake drum and said brake shoes.

2. The brake centering mechanism according to claim 1 wherein the centering means includes a substantially U-shaped bracket slidably carried by said stationary member in frictional engagement therewith and a resilient clip carried by the U-shaped bracket in biased engagement with the star wheel actuator.

3. The brake centering mechanism according to claim 1 wherein the bracket adjustably carried by said stationary member is frictionally held against said stationary member by a pin having one end held against the opposite side of the stationary member and another end urging said resilient means against a portion of said bracket, said pin being mounted in a slot formed in the stationary member to allow the pin a range of movement.

4. The brake centering mechanism according to claim 3 wherein said resilient means is an omega shaped spring clip having opposed resilient portions bearing on either side of the star wheel actuator and a depressed head portion providing a resilient mounting for the pin thereby keeping said bracket in biased frictional engagement with said stationary member.

5. The brake centering mechanism according to claim 3 wherein said resilient means has outwardly extending leg portions arranged to form a lost motion connection between said bracket and said resilient means proportional to the allowable predetermined brake clearance.

References Cited by the Examiner
UNITED STATES PATENTS

| | | | |
|---|---|---|---|
| 2,025,673 | 12/1935 | Reynolds | 188—79.5 |
| 2,084,972 | 6/1937 | Irving | 188—79.5 |
| 3,189,131 | 6/1965 | Price | 188—79.5 X |

DUANE A. REGER, *Primary Examiner.*